United States Patent [19]

Guilbert

[11] 4,267,300

[45] May 12, 1981

[54] EPOXY RESIN POWDER FOR APPLYING ELECTRICAL-INSULATING COATING TO WIRE

[75] Inventor: Curtis R. Guilbert, St. Paul, Minn.

[73] Assignee: Minnesota Mining and Manufacturing Company, St. Paul, Minn.

[21] Appl. No.: 80,989

[22] Filed: Oct. 1, 1979

[51] Int. Cl.³ .................. C08G 59/16; C08G 59/42
[52] U.S. Cl. .................. 528/92; 260/37 EP; 427/195; 428/379; 528/115
[58] Field of Search ................... 528/92, 115

[56] References Cited

U.S. PATENT DOCUMENTS

| | | | |
|---|---|---|---|
| 3,041,302 | 6/1962 | Leutner | 260/31.8 |
| 3,344,096 | 9/1967 | Manasia et al. | 260/18 |
| 3,477,971 | 11/1969 | Allen et al. | 260/18 |
| 4,040,993 | 8/1977 | Elbling et al. | 260/18 EP |
| 4,119,593 | 10/1978 | Smith et al. | 260/18 EP |

Primary Examiner—Earl A. Nielsen

[57] ABSTRACT

Powder useful for applying electrical-insulating coatings to wire, the powder being a blend of (a) polyglycidyl ether capped with monobasic aromatic acid such as benzoic acid and (b) trimellitic anhydride.

6 Claims, No Drawings

EPOXY RESIN POWDER FOR APPLYING ELECTRICAL-INSULATING COATING TO WIRE

FIELD OF THE INVENTION

The invention concerns powder useful for applying electrical-insulating coatings to wire and, more specifically, is concerned with powder comprising a thermosetting epoxy resin composition.

BACKGROUND OF THE INVENTION

Wires such as are used in the windings of transformers and motors are often insulated by enamels applied from organic solvent, and their application can involve health, fire and air-pollution hazards. To avoid these hazards, the wire may instead be insulated by kraft paper, but this is slow and expensive and undesirably increases the bulk of the winding.

It has long been known that epoxy resin powders provide coatings having good electrical-insulating properties without polluting the atmosphere. Most such coatings are far too hard and brittle to provide electrical-insulating coatings for wires, because they tend to crack when subjected to severe stress, either upon being bent or upon expanding and contracting with changes in temperature. The stress can be especially severe when the wire has the rectangular cross-section which is usually specified for windings of the largest wire gauges. The coatings must be resistant to abrasion at the high speeds at which the wires may be wound and to chemicals such as hot transformer oils and the automotive fluids to which starter motor windings may be exposed.

Some epoxy coating powders have been specially designed to provide good toughness and flexibility while retaining good electrical-insulating properties. See for example U.S. Pat. No. 3,477,971 (Allen et al). The powder of its Example I comprises a blend of polyglycidyl ether of bisphenol A, trimellitic anhydride and stannous octoate. Coatings of this and other powders of the patent did not meet the current rigorous specifications of at least one large manufacturer of electrical distribution and power transformers.

Another epoxy powder which was specifically developed for wire coatings is disclosed in U.S. Pat. No. 4,040,993 (Elbling et al). This patent suggests that better toughness and flexibility can be obtained from a mixture of three different epoxy resins plus a pre-prepared epoxy ester and a curing agent containing trimellitic anhydride. It is believed that this powder also did not meet the aforementioned specifications.

THE PRESENT INVENTION

The present invention provides a powder which is believed to be the first powder to be suitable as a replacement for solvent-based enamels for electrical-insulating coatings of wire. The powder has been shown to be especially useful for coating square #10 (100 mils) and larger wire and has also proven useful for round wires as small as #18 (40 mils). More specifically, the novel powder is believed to be the first powder which provides cured coatings having good electrical-insulating values, good resistance to physical stresses such as thermal shock, and good chemical resistance.

In brief, the novel powder comprises a blend of (a) polyglycidyl ether of bisphenol A, capped with monobasic aromatic acid such as benzoic acid in an amount providing as its ester from 1 to 5% by weight of the polyglycidyl ether, said polyglycidyl ether having an epoxide equivalent weight of 1200–2200 and an epoxide functionality of 1.2–1.6, and (b) 0.9–1.5 equivalents of trimellitic anhydride per epoxide equivalent of the polyglycidyl ether.

While the aforementioned components (a) and (b) interact readily when heated to moderately elevated temperatures, the rate of reaction is substantially enhanced by the presence of a catalytic amount of any of a large number of catalysts known to accelerate epoxide-anhydride interaction. However, the catalyst should be selected from those which do not render the cured coating corrosive or otherwise deleteriously affect electrical-insulating properties. Particularly preferred are stannous salts as listed in the aforementioned U.S. Pat. No. 3,477,471, especially stannous octoate. The catalyst is preferably used in amounts from about 0.1% up to 0.5% by weight of the polyglycidyl ether. At such amounts, the powder should be storable at room temperature for many months. Higher amounts may cause some reduction in dielectric properties and would shorten the shelf life, whereas amounts below 0.1% provide a somewhat slower rate of reaction. Within the range of 0.1 to 0.5%, substantially complete curing of coatings of the powder can be expected within six minutes at about 450° F. and within 45 seconds at about 635° F.

Very little difference in the properties of the cured coatings has been noted with differing amounts of trimellitic anhydride within the range of 0.9 to 1.7 equivalents of the anhydride per epoxide equivalent, based on trimellitic anhydride having a functionality of 2. Below 0.9 equivalent of the anhydride, the polyglycidyl ether might not become fully cured, whereas above 1.5 some of the trimellitic anhydride tends to sublime at the curing temperature and to be wasted as well as causing a health hazard.

When the epoxide equivalent weight of the polyglycidyl ether is close to 1200, it is preferred that the epoxide functionality be close to 1.2 to space out the crosslinks sufficiently to provide the desired flexibility of cured product. Preferably the epoxide equivalent weight is about 1800–2000 since this provides cured products of both greater strength and flexibility. However, above about 2200, the melt viscosity may become unduly high so that good coalescing of the fused powder particles may not be obtained. While the function of the ester caps is not fully understood, they appear to have a viscosity-depressing function that enables the epoxide equivalent weight to be unusually high without inhibiting the necessary coalescing of the fused powder.

As is well known in the art, the powder preferably contains a flow control agent such as a copolymer of 2-ethylhexyl acrylate and ethyl acrylate. It tends to minimize the formation of pinholes in the cured coatings. Nevertheless, it may be desirable to apply a second coating to cover any pinholes in the first. The powder preferably is mixed with finely divided silica to inhibit any tendency for the powder to block during storage and shipment and also to enhance fluidization of the powder.

The powder preferably is pigmented for color-coding purposes and to provide an indication of the degree of cure. Preferably the pigment is inorganic for thermal stability and chemical resistance.

In a typical coating operation, wire is cleaned and passed through a cloud of electrostatically-charged powder at ordinary room temperature, and the powder-coated wire is heated to 450°–650° F. to fuse and cure the powder.

HEAT SHOCK TEST

A large manufacturer of electrical distribution and power transformers employs this Heat Shock Test for screening the insulating coatings. A coated wire specimen 10–14 inches in length is bent 90° over a mandrel having a diameter four times the thickness of the specimen in the direction of bending, and another portion of the specimen is bent 90° over the mandrel in the opposite direction. Additional properties of each specimen are bent to provide at least four 90° bends. If the wire is not square or round, one wire specimen is bent in the directions of maximum thickness and another in the directions of minimum thickness, using mandrels having diameters four times each thickness. Each specimen is then placed in an oven at 175° C. for 30 minutes. After cooling, it is inspected for cracks. Any visible crack constitutes failure. In this test, a range of coating thicknesses of a given powder is tested. The thickest coating which has no visible cracks is an indication of quality. A leading manufacturer of electrical distribution and power transformers indicates a strong preference for materials which provide coatings that pass the Heat Shock Test at thicknesses of at least 7 mils total build (3.5 mils coating thickness).

In the example, all parts are by weight.

EXAMPLE

| Ingredients | Parts |
| --- | --- |
| Epoxy resin | 800 |
| Trimellitic Anhydride | 58.7 |
| Flow control agent | 13.6 |
| Yellow iron oxide pigment | 16.0 |
| Titanium dioxide pigment | 8.0 |
| Stannous octoate | 1.6 |
| Fumed silica having hydrophobic surface treatment | 1.8 |

The epoxy resin was a polyglycidyl ether of bisphenol A and was end-capped with benzoic acid, which as benzoate constituted about 3% of the resin. Epoxide equivalent weight was 1790. Molecular weight, as measured by gel permeation chromatography, was 2640 for the number average molecular weight and 7220 for the weight average molecular weight. The epoxide functionality was 1.47. The melt viscosity at 150° C. was 68,000 cps. Such an epoxy resin is marketed by Reichhold Chemicals Inc. as "Epotuf" 37-006.

Since trimellitic anhydride is assigned a functionality of 2 as noted above, the composition contained 1.37 equivalents of the anhydride per epoxide equivalent.

The flow control agent was a copolymer of about two parts 2-ethylhexyl acrylate and one part by weight ethyl acrylate having an intrinsic viscosity of 0.2, available on the market as "Modaflow". The fumed silica was "Tullanox" 500.

The epoxy resin, which was in flake form, was preground in a pulverizer and transferred to a storage hopper. The trimellitic anhydride, in flake form, was also preground into a powder and repackaged in moisture-proof containers.

To a dry-mixing ribbon blender the preground epoxy resin, the flow-control agent and stannous octoate were charged in order, followed by the pigments. Then the preground trimellitic anhydride was charged and mixing was continued for another five minutes. The total mixing time was ten minutes. This blended premix was then conveyed to a hopper, which served as a reservoir for feeding a co-rotating, twin-screw mixing extruder. Temperatures in the barrel were 150° F. in the feed zone, 165° F. in the mixing zone, and 250° F. at the discharge zone. The throughput rate was 800 pounds per hour.

The homogenized, melt-mixed extrudate was passed through a pair of water-cooled rolls and along a cooled endless metal belt. The cooled sheet of about ¼-inch thickness was broken into small pieces which were fed into a pulverizer to produce powdered resin which was combined in another dry-mixing blender with the silica. The blended powder was fed through a final screen (94 mesh, 180-micrometer openings) and placed in moisture-proof bags. The powder had the following properties:

7% Retained on 200 mesh (74-micrometer openings)
28% Retained on 325 mesh (44-micrometer openings)
49% Retained on 400 mesh (37-micrometer openings)
Gel Time at 400° F.: 32 seconds.
Moisture Content, Karl Fischer Method 0.16%.

Using an electrostatic fluidized bed, the powder was coated onto clean #10 square, fully-annealed aluminum wire. The coated wire was heated in an oven at 450° F. for six minutes to fuse and convert the powder into a smooth, cured coating. A length of the coated wire having a total build of 5 mils was elongated 15% without any visible cracks appearing in the coating. Lengths having total builds as thick as 17 mils were bent 90° over a mandrel having a diameter 4 times the diameter of the wire without visible cracking of the coating. In the Heat Shock Test, no visible cracks appeared in coatings having total builds up to 15 mils, indicating extraordinary toughness.

Specimens of the coated wire having total builds of 5 to 7 mils were tested for dielectric properties:

| | |
| --- | --- |
| Dielectric strength | 3.8–4.6 kilovolts |
| Dissipation factor at 100 Hz and 150° C. | 5.9% |
| Dielectric constant at 100 Hz and 150° C. | 3.95 |

What is claimed is:
1. Powder useful for applying electrical-insulating coatings to wire comprising a blend of
 (a) polyglycidyl ether of bisphenol A, capped with monobasic aromatic acid in an amount providing as its ester from 1–5% by weight of the polyglycidyl ether, said capped polyglycidyl ether having
  an epoxide equivalent weight of 1200–2200 and
  an epoxide functionality of 1.2–1.6, and
 (b) 0.9–1.5 equivalents of trimellitic anhydride per epoxide equivalent.
2. Powder as defined in claim 1, wherein the blend includes
 (c) a catalytic amount of a catalyst for accelerating reaction between the polyglycidyl ether (a) and the anhydride (b).
3. Powder as defined in claim 2, wherein the catalyst (c) is a stannous salt.
4. Powder as defined in claim 3, wherein the stannous salt is stannous octoate.
5. Powder as defined in claim 1, wherein the blend further comprises inorganic pigment.
6. Powder as defined in claim 1, wherein said monobasic acid was benzoic acid.

* * * * *